United States Patent [19]

Mathison et al.

[11] Patent Number: 4,614,206

[45] Date of Patent: Sep. 30, 1986

[54] EXPANSIBLE PNEUMATIC PLUG DEVICE

[75] Inventors: Allen D. Mathison, Richfield; Dale K. Nelson, Minneapolis, both of Minn.

[73] Assignee: Cherne Industries, Inc., Minneapolis, Minn.

[21] Appl. No.: 797,886

[22] Filed: Nov. 14, 1985

[51] Int. Cl.[4] .............................................. F16L 55/10
[52] U.S. Cl. ........................................ 138/93; 138/89; 138/90; 277/34.6; 285/259
[58] Field of Search ..................... 138/89, 90, 93, 109; 277/34.6; 285/242, 252, 253, 254, 259

[56] References Cited

U.S. PATENT DOCUMENTS

| | | | |
|---|---|---|---|
| 1,221,733 | 4/1917 | Henderson | 73/49.8 |
| 2,681,706 | 6/1954 | Pottorf | 277/34.6 |
| 2,974,685 | 3/1961 | Ver Nooy | 138/90 |
| 3,129,726 | 4/1964 | Moore | 220/239 |
| 3,292,254 | 12/1966 | Sloan | 138/90 |
| 3,902,528 | 9/1975 | Tartabini | 138/90 |
| 4,449,584 | 5/1984 | Christensen | 277/34.6 |

OTHER PUBLICATIONS

Cherne Industries, Inc., Multi-Size Muni-Ball, 5/76, Product Brochure.
American Logiball, Inc., Reinforced Rubber Multisize Plugs, 2/84, Product Brochure.

Primary Examiner—Stephen Marcus
Assistant Examiner—Leo J. Peters
Attorney, Agent, or Firm—Anthony G. Eggink

[57] ABSTRACT

A multi-size expansible pneumatic plug device for sealing the interior of a pipeline section. The expansible plug device has interchangeable front and rear circular rigid support members for supporting the remaining elements of the device and each rigid support member has a generally flat end portion and a body portion having parallelly disposed circumferential ridges to form first and second grooved portions. The circumferential ridges have top surfaces of an equal predetermined inclined slope. At least one of the rigid support members additionally has an air inlet means. An exteriorly smooth and interiorly corded elastomeric sleeve member is provided for expansion to seal against the interior wall of a pipeline section. The sleeve member has interiorly disposed parallel circumferential rings of a predetermined spacing inward its ends. A pair of strapping clamp members hold the sleeve member rings matingly between the parallel ridges and in the grooved portions of each rigid support member during assembly. A pair of tapered end ring members having an interior frustoconical configuration of the same predetermined slope as the rigid support member ridge surfaces are provided for frictionally engaging and fixing the sleeve member to the front and rear rigid support members.

16 Claims, 11 Drawing Figures

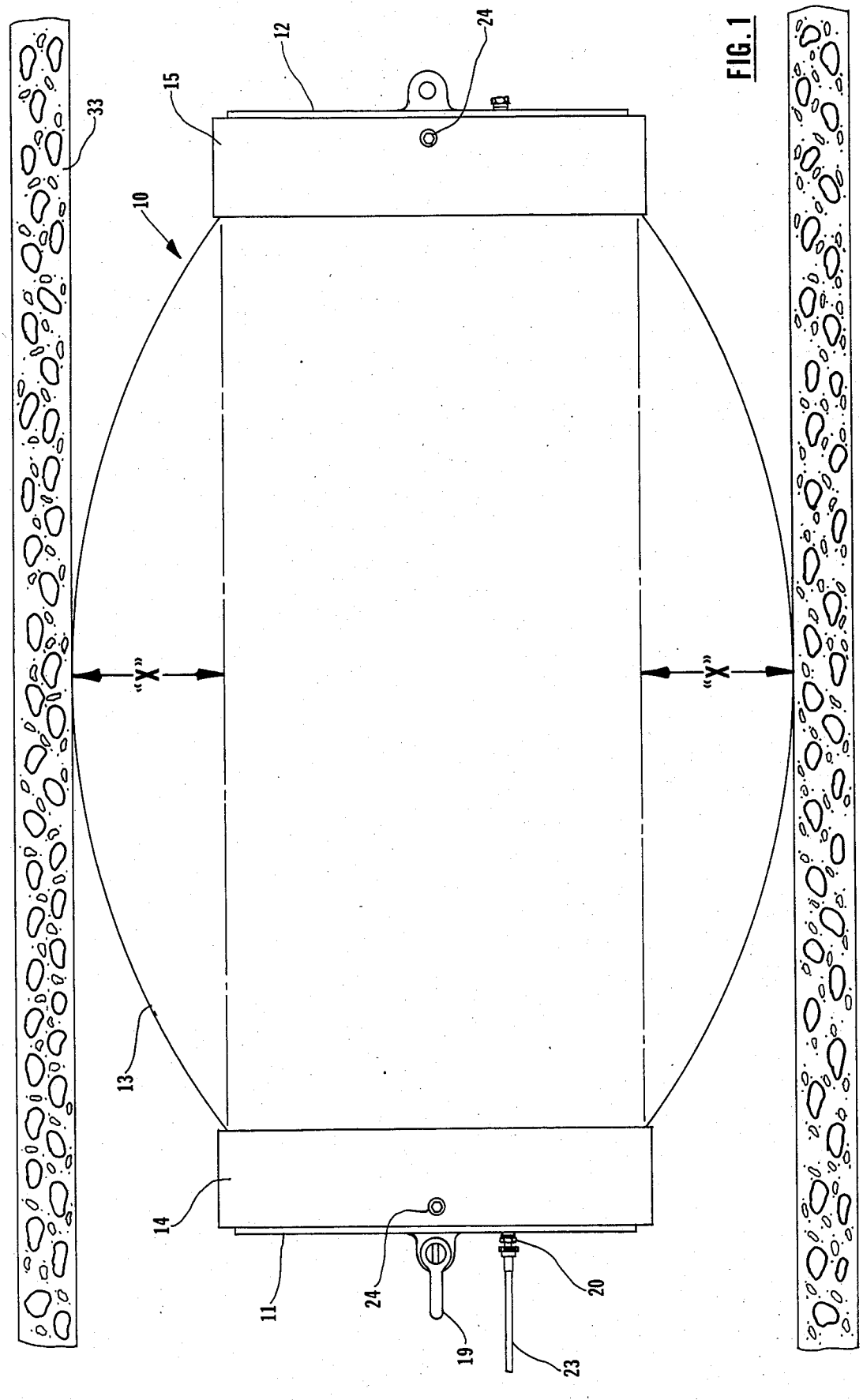

EXPANSIBLE PNEUMATIC PLUG DEVICE

BACKGROUND OF THE INVENTION

This invention relates to a pneumatic plug device for sealing pipelines. Particularly, this invention deals with multi-size expansible penumatic plug devices used for sealing the interior of a range of pipeline diameters.

For example, the multi-size pneumatic plug devices according to the invention are constructed for sealing the interior of pipeline diameters which range in dimension from 12–18, 16–24 or 24–36 inches. Thus, the multi-size expansible pneumatic plug devices according to the invention are designed for sealing a range of pipeline sections rather than being designed to seal a specific or single pipeline diameter.

The expansible pneumatic plug devices are constructed of elements that permit easy manufacturing assembly and which result in multi-size pneumatic plug devices that are durable, versatile and effective in sealing pipeline sections.

In the past, several types of expansible pneumatic plug devices have been proposed or utilized for use in sealing varying diameter pipeline sections. However, these plug devices have generally been complex in construction, limited in use, unsuited for multi-size use, difficult to assemble and expensive to manufacture.

For example, some prior art devices are inflatable packer devices having elastomeric sleeve members that are retained to the device body by exteriorly disposed clamping bands. This attachment means is generally unsuited for securely holding sleeve members during repeated use of multi-size pneumatic devices. Additionally, sleeve members have been proposed having surface patterns which are designed primarily for gripping interior pipeline surfaces as opposed to sealing these surfaces.

Other prior art devices have also proposed complex means to retain their respective sleeve members to the structural supporting elements of their respective devices, such as by using threaded end members, and they have also proposed devices having only one supported end member. Still other devices have been proposed for specific applications which are not suitable for the inflation pressures needed in sealing applications for which the multi-size pneumatic plug devices of this invention are designed.

Further, prior art devices have been proposed which utilize sleeve member configurations which result in low air volume leakage at low sealing or pipeline back pressures.

The multi-size expansible pneumatic plug devices of this invention are provided to overcome the problems and limitations associated with these prior art devices.

SUMMARY OF THE INVENTION

The invention provides a multi-size, expansible pneumatic plug device for sealing the interior of a pipeline section. The device has expansible body portions to permit the sealing of a predetermined range of pipeline diameters. The pneumatic plug device has interchangeable front and rear circular rigid support members for supporting the remaining elements of the device.

Each rigid support member has a generally flat end portion and a body portion having parallely disposed circumferential ridge members to form first and second grooved portions. The circumferential ridge members have top surfaces that lie in a plane of a predetermined inclined slope. At least one of the rigid support members additionally has air inlet means.

The pneumatic plug device further has an exteriorly smooth and interiorly corded elastomeric sleeve member for expansion to seal against the interior wall of a pipeline. The sleeve member has interiorly disposed parallel circumferential rings of a predetermined spacing inward its ends to engage the first and second grooved portions of the support members.

Further provided in the multi-size expansible pneumatic plug device of this invention are tapered end ring members having an interior frustoconical configuration of the same predetermined slope as the top surfaces of the rigid support member ridges. This configuration provides for the frictional engagement and fixing of the elastomeric sleeve member to the front and rear rigid support members.

Also provided by the invention are strapping clamp members and a plurality of set screw means which are utilized in the assembly of the multi-size pneumatic plug device and for fixing the end ring members to the rigid support members as well as to fixingly hold the sleeve member between the support members and the end rings.

Additionally provided by the invention is an elastomeric sleeve member having certain configurations, cording strand and reinforcement configurations, and which is constructed of specific elastomeric materials.

The invention also provides specific material compositions for constructing the rigid support members and the tapered end ring members.

Also provided by this invention is a process for manufacturing the elastomeric sleeve member which results in optimal and beneficial results for its intended use as a component in a multi-size expansible pneumatic plug device.

These and other benefits of this invention will become clear from the following description, by reference to the drawings.

BRIEF DESCRIPTION OF THE DRAWINGS

FIG. 1 is a lateral plan view of the multi-size expansible pneumatic plug device of this invention and which shows the device in an operable expanded state in a pipeline section;

DESCRIPTION OF THE PREFERRED EMBODIMENTS

Figure 4:
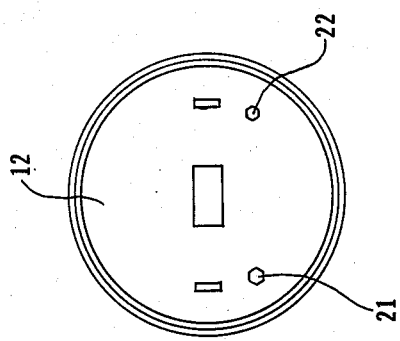
FIG. 4 is a plan view showing the opposite end of the expansible pneumatic plug device shown in FIG. 2.

The expansible pneumatic plug device 10 of the invention deals with a multi-size device for sealing the interior of pipeline sections. The multi-size pneumatic plug device 10 is operable in sealing a predetermined range of inside pipeline diameter dimensions.

For example, a device 10 having an exterior diameter dimension of approximately 14.5 inches is designed for use in pipelines having an interior diameter range of 16 to 24 inches; a device 10 having an exterior diameter dimension of approximately 10.5 inches is designed for use in pipelines having an interior diameter range of 12 to 18 inches, and a device 10 having an exterior diameter dimension of approximately 20¾ inches is designed for use in pipelines having an interior diameter range of 24 to 36 inches. Additionally, the devices are designed for pipeline diameters ranging from 8 to 12 inches and 33 to 54 inches. Generally, however, the multi-size pneumatic plugs of this invention are designed to expand from 125 to 200% from its unexpanded diameter.

FIG. 1 illustrates the multi-size expansible pneumatic plug device 10 as having a front rigid support member 11, a rear rigid support member 12 and a pre-fabricated elastomeric sleeve 13. The pneumatic plug device is shown in an expanded state whereby sleeve 13 has been expanded a distance "X" from its original, unexpanded state. The elastomeric sleeve 13 is shown in sealing communication with the interior surface of a pipeine section 33.

Figure 2:
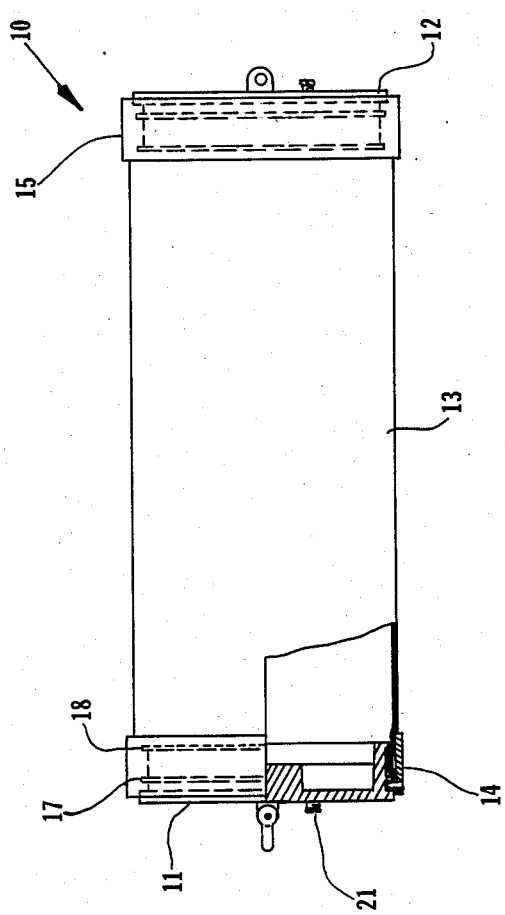
FIG. 2 is a lateral plan view of the expansible pneumatic plug device of this invention and showing cut-away portions of the plug device body in its unexpanded state.

As is further shown in FIG. 2, the rigid support members 11 and 12 have external ridges 17 and 18 which are used to secure the sleeve member 13 by means of a strapping clamp 16 which holds a portion of the sleeve between these outwardly extending ridges. The strap clamp 16 is not the primary source of the mechanical bond, as will be further discussed, in that it serves primarily to hold the pre-fabricated sleeve to the ridged, rigid support ends during assembly of the device.

The pneumatic plug device 10 additionally has front and rear tapered end ring members 14 and 15 which, along with set screw 24, are provided to secure the sleeve 13 and the ring members 14 and 15 respectivly to the front and rear rigid support end members 11 and 12. Front rigid support end member 11 is provided with a valve snifter and cap 20 for the input and release of compressed air. A compressed air line 23 is shown attached to snifter valve 20 so that the expansible pneumatic plug device 10 can be inflated and deflated from a remote location. A clevis shackle 19 is shown attached to front rigid support end member 11 to provide means for moving the expansible pneumatic plug device 10 through a pipeline.

Figure 3:
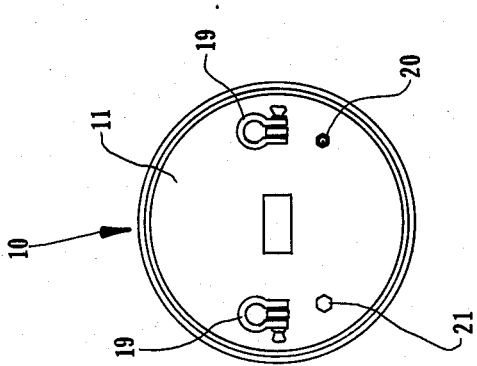
FIG. 3 is an end plan view of the expansible pneumatic plug device shown in FIG. 2.

FIGS. 2, 3 and 4 show the front rigid support member 11 having a pair of clevis shackles 19 to lift and move the device and a valve snifter and cap 20 to inflate and deflate the sleeve member 13 for pipeline sealing use. Brass plugs 21 and 22 are provided in the rear rigid support end 12 for conversion for other uses, such as leak locations. These plugs additionally make the front and rear support members 11 and 12 interchangeable in that the valve snifter 20 can be placed in the other support member and the shackle 19 can also be so interchanged.

Figure 8:
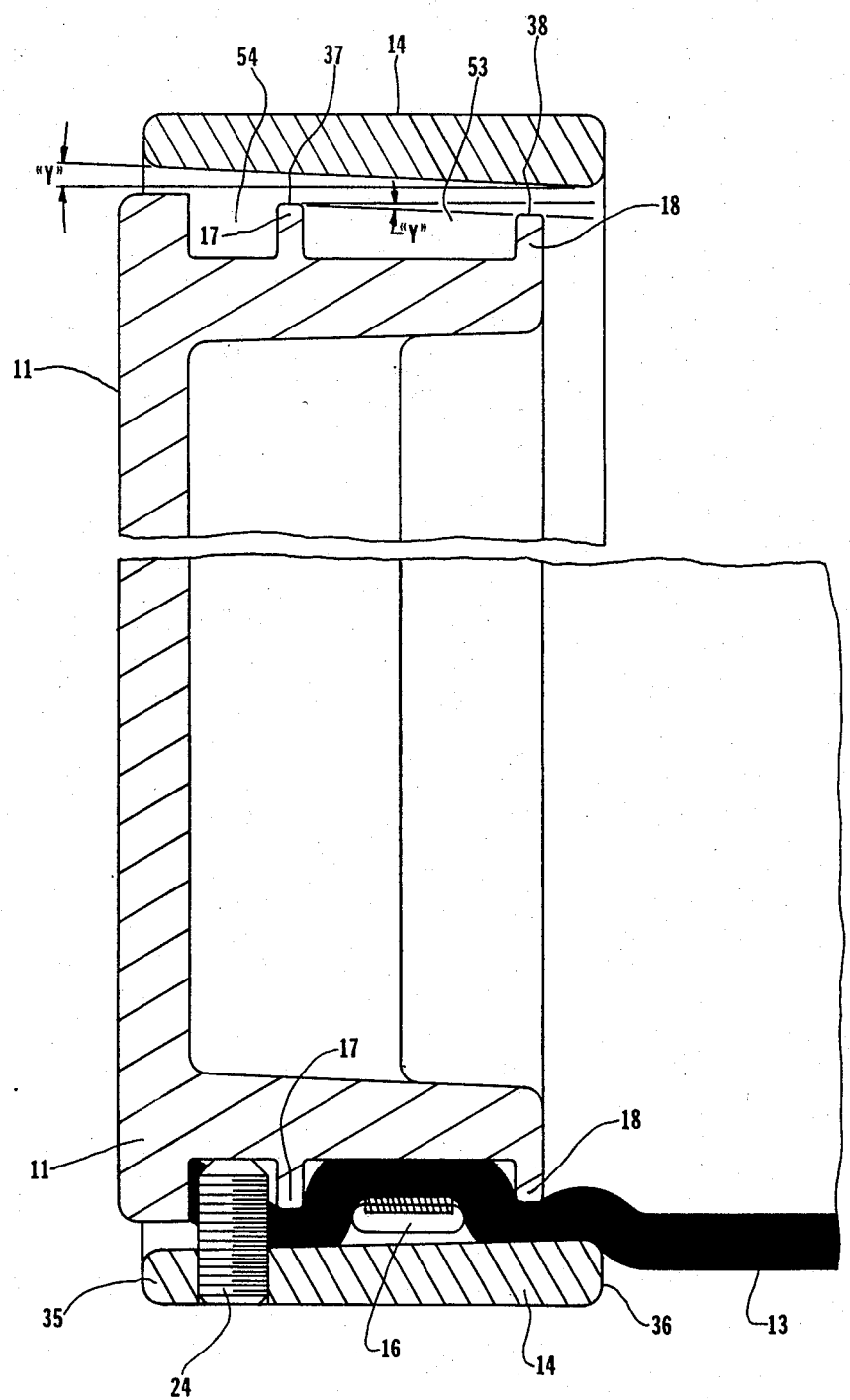
FIG. 8 is an enlarged segmented view showing the attachment of the elastomeric sleeve member of the expansible pneumatic plug device to a rigid support end member.

Importantly, and particularly shown in FIG. 8, a tapered clamping ring member 14 covers and ultimately frictionally and mechanically secures the sleeve member 13 to the externally and outwardly extending ridges 17 and 18 of the rigid support member 11. This mechanical bond and the tapering thicknesses 35 and 36 of the tapered ring 14 squeezes the rubber sleeve 13 into the channel or grooved areas 53 and 54 between ridges 17 and 18 and ridge 17 and the back of the front face of support member 11.

FIG. 8 shows the circumferential ridge members 17 and 18 having top surfaces 37 and 38 which have a predetermined inclined slope "Y". Additionally, the tapered end ring 14 has the same inclined slope "Y" which preferably is two plus or minus one half degree.

Figure 7:
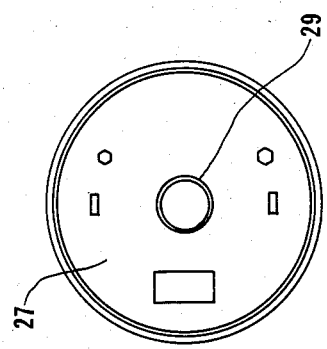
FIG. 7 is a plan view showing the opposite end of the expansible pneumatic plug device embodiment shown in FIG. 5.
Figure 5:
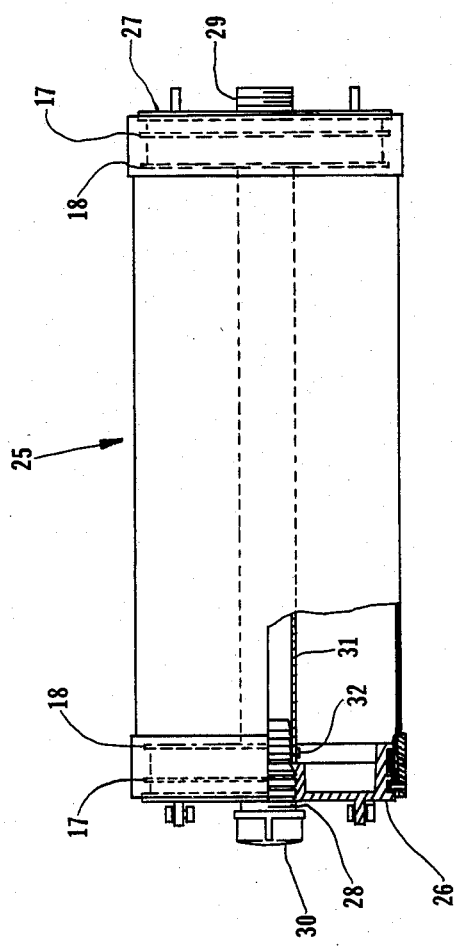
FIG. 5 is a lateral plan view of another embodiment of the multi-size expansible pneumatic plug device of this invention and which shows cut-away portions of the plug device body in its unexpanded state.
Figure 6:
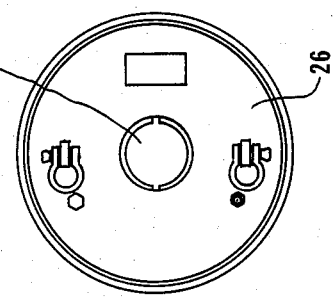
FIG. 6 is an end plan view of the expansible pneumatic plug device embodiment shown in FIG. 5.

FIGS. 5, 6 and 7 illustrate another embodiment of the expansible pneumatic plug device 25 of the invention. Although similar in construction to plug device 10, the device 25 additionally has rigid support ends 26 and 27 with internally or externally threaded pipe 28. A bypass hose 31 is connected between the pipe portions 28 and 29 by clamps 32.

Thus, the expansible plug device 25 permits the threaded cap 30 or optionally a threaded plug to be removed so that a hose structure can be connected for directing any blocked fluid to an external location such as through a manhole access while the device 25 is inflated to a seal a pipeline for maintenance, test or other purposes, whereby two such devices 10 may be used.

It has been found that the clamping ring members 14 and 15 are preferably cast and constructed of ductile cast iron, cast steel or cast stainless steel. It has also been found that the rigid support members 11, 12, 26 and 27 are preferably constructed of aluminum, stainless steel or an engineering grade plastic material.

Figure 9:
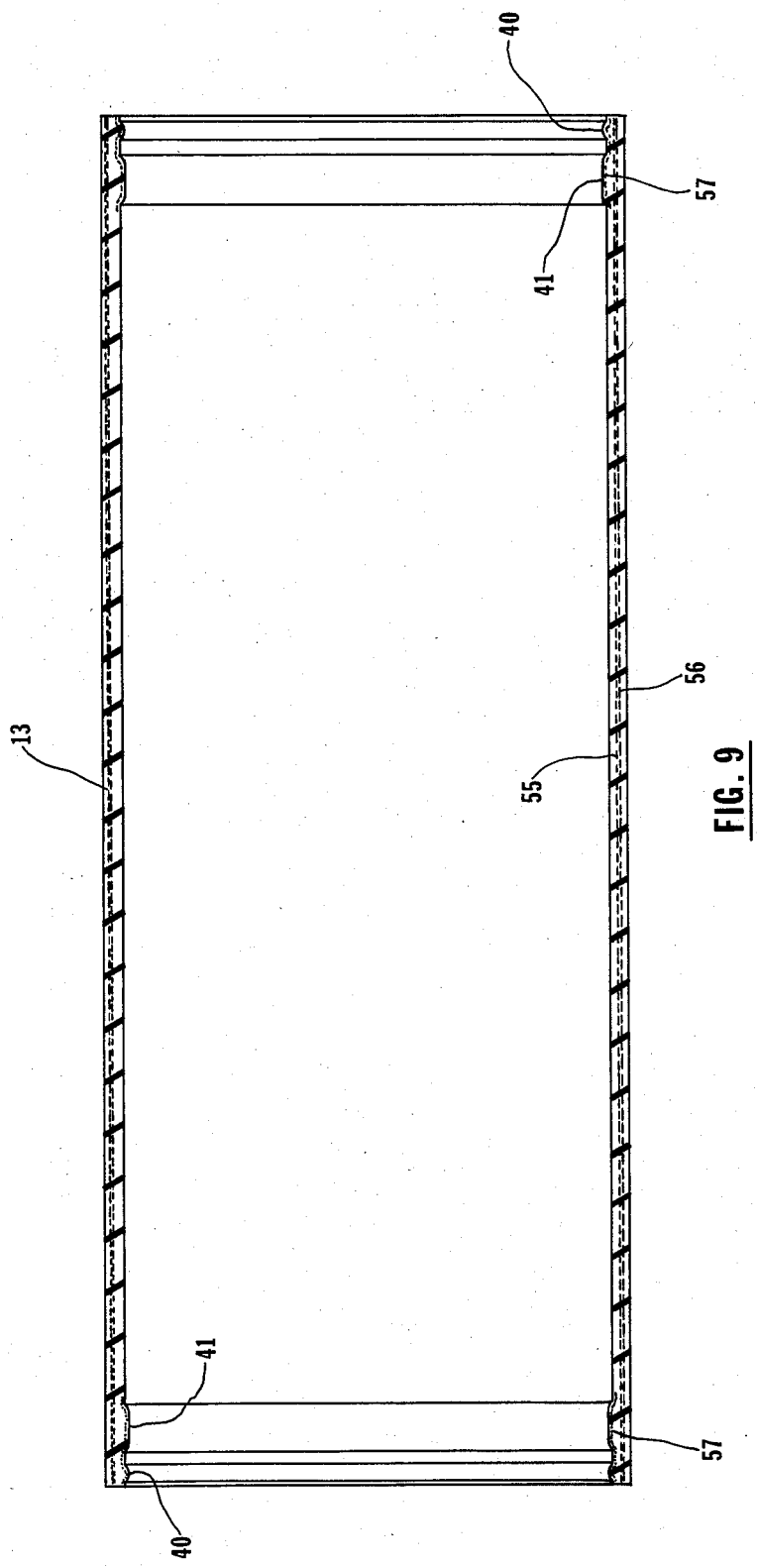
FIG. 9 is a sectional view of the elastomeric sleeve member of the expansible pneumatic plug device of the invention.

FIG. 9 further illustrates the interior detail of the elastomeric sleeve member 13. Importantly, circumferential inner fastening rings 40 and 41 are provided for mating and securing between the circumferential ribs 17 and 18 and into the grooves 53 and 54, as shown in FIGS. 2, 5 and 8. Cording strands 55 and 56 are shown interiorly disposed in the sleeve member 13. Additionally, reinforcement cording strands 57 are shown at the sleeve ends for added support. The cording prevents longitudinal expansion during inflation of the plug device.

It has also been determined that the unidirectional or longitudinally extending cord strands, as well as the reinforcement cords in sleeve member 13 that consist of polyisoprene, polychloroprene, synthetic poly-isoprene, butadiene acrylonitrile, polyurethane, polysiloxane or fluoronated hydrocarbon elastomers are well suited for multi-size pneumatic plugs 10 as described herein.

Figure 10:
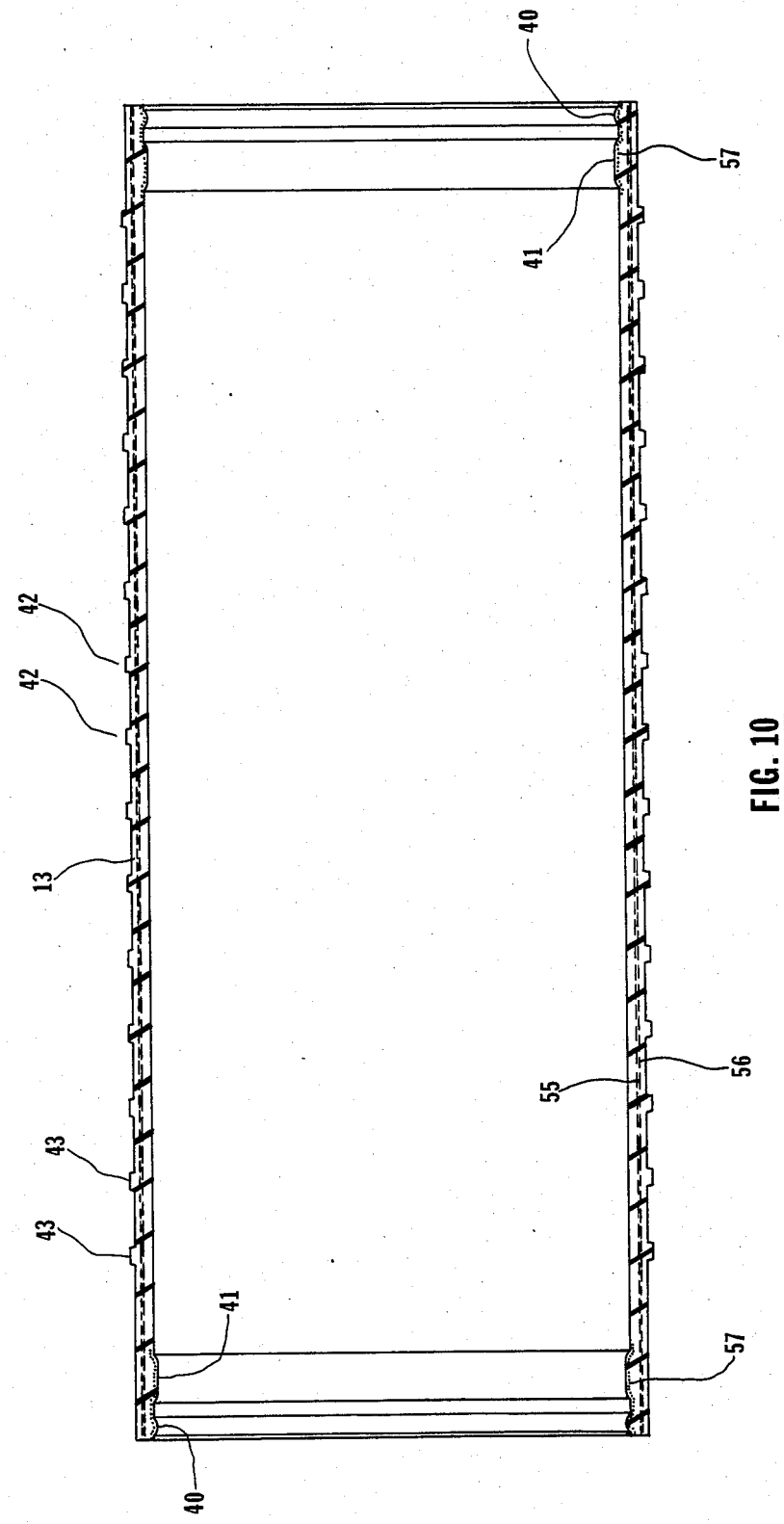
FIG. 10 is a sectional view of another embodiment of the elastomeric sleeve member shown in FIG. 9.

FIG. 10 illustrates another embodiment of the elastomeric sleeve member 13. A plurality of outer circumferential sealing ribs 42 have been added to the exterior of elastomeric sleeve member 13 for sealing purposes. Although the design pattern of outer circumferential sealing ribs 42 shown is not essential to the sealing function of expansible pneumatic plug device 10, one or more outer circumferential sealing ribs 42 centrally disposed on elastomeric sleeve member 13 aid in minimizing low pressure leaks and in dealing with interior surface irregularities of a conduit 33. However, outer circumferential sealing ribs 43 generally will not come in contact with interior wall surfaces of conduit 33.

Figure 11:
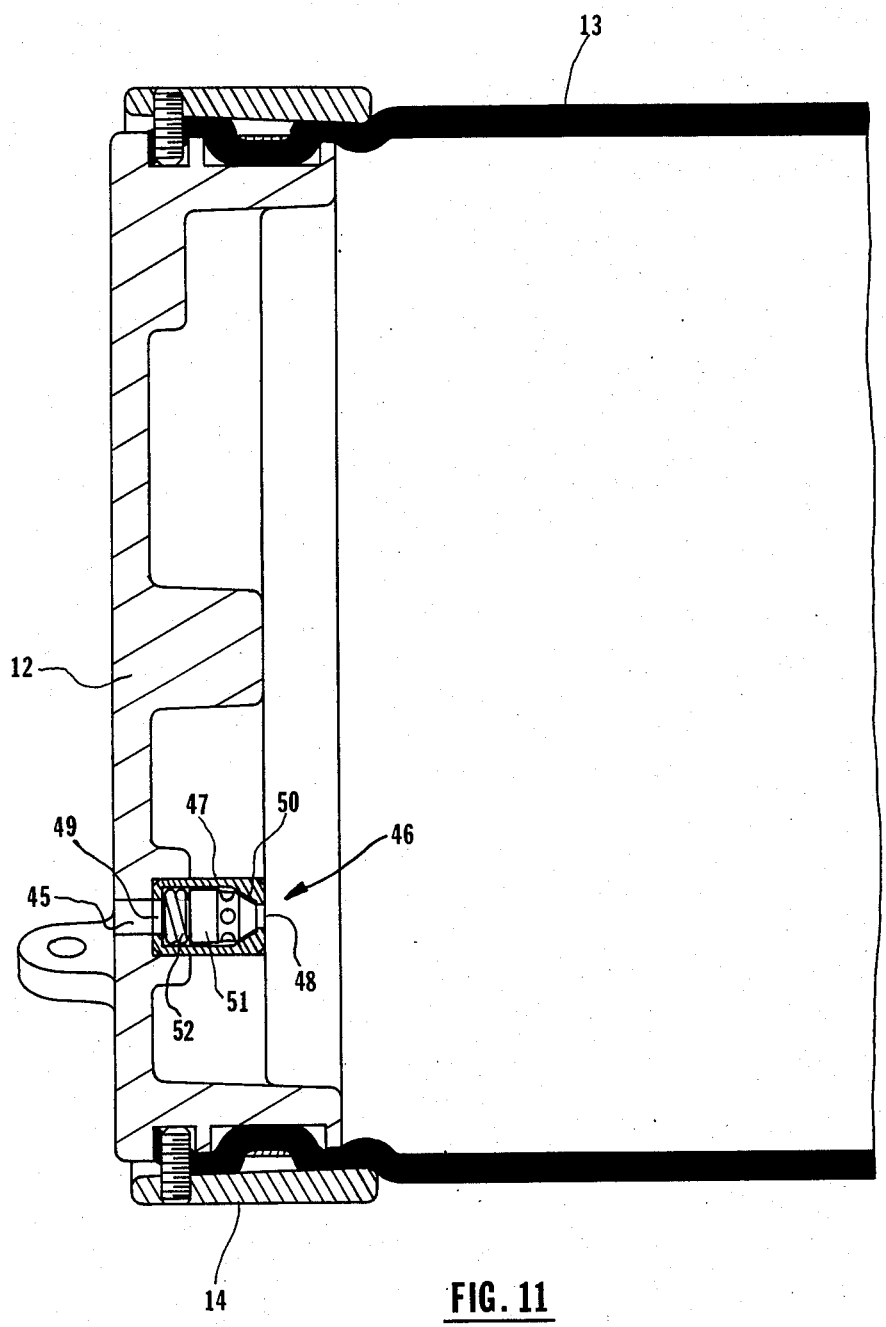
FIG. 11 is a partial, sectional and cut-away view of the expansible pneumatic plug device of the invention and which shows a pressure relief valve incorporated into a rigid support end member.

FIG. 11 illustrates an internally mounted pressure relief valve 46 at aperture 45 of rear rigid support end member 12. The pressure relief valve 46 is constructed of a valve body 47 having a front aperture 48, rear aperture 49 and sloped seating surface 50. A piston head and stem 51 having a spring at a preset tension 52 is seated in valve body 47 and the spring 52 is, thus, activated at a predetermined preset pressure to release compressed air through front aperture 48 and out aperture 45 should the air pressure in the elastomeric sleeve member 13 exceed the predetermined pressure.

The pressure relief valve 46 has a spring 52, for example, which operates at a preset pressure, which is approximately 5 to 10 p.s.i. above the recommended inflation pressure of device 10, which generally ranges between 25 to 50 p.s.i., depending upon plug size.

The rubber sleeve structure 13 of the two pneumatic plug devices 10 and 25 is preferably pre-fabricated by means of spirally wrapping raw natural rubber sheeting over an internal mandrel.

It has been found that a sleeve member 13 constructed of elastomeric materials consisting of poly-isoprene, polychloroprene, synthetic poly-isoprene, butadiene acrylonitrile, polyurethane, polysiloxane or fluoronated hydrocarbon elastomers are well suited for multi-size pneumatic plugs 10 as described herein.

Additionally, with the predetermined slopes of two plus or minus one half degree of the top surfaces 37 and 38 of the circumferential ridges 17 and 18 and the frustoconical interior surface of sleeves 14 and 15, that a sleeve member 13 have a Shore-A durometer reading of 50 to 70. This configuration permits the compression of the sleeve members from 24 to 32%.

The elastomeric sleeve member is manufactured by a process of initially providing a mandrel having a circular cross-section and having a pair of circumferential parallel grooves disposed at its opposite ends. An elastomeric material is wrapped about the mandrel to a predetermined thickness. Next, a heat insensitive tape is wrapped tightly about the elastomeric material and is placed in an autoclave for curing. The tape from the cured elastomeric material is unwrapped and the cured elastomeric material is placed on a lathe and the exterior surface of the cured elastomeric material is ground to provide an elastomeric sleeve member having a smooth exterior surface for sealing purposes. Finally, the mandrel is removed from the cured and ground elastomeric sleeve member for assembly.

This sleeve manufacturing process has the advantage over prior art manufacture by yielding a more uniform wall thickness and by yielding an exterior surface void of a corded or wrap like configuration which inherently sets up leak paths. A sealing type exterior configuration in sleeve 13 having circumferential ribs can also be added in this manufacturing process to result in the sleeve configuration shown in FIG. 10.

During the assembly of plug device 10, the tapered end ring members 14 and 15 are forced onto the support members 11 and 12 having the sleeve 13 placed thereabout and held by strapping clamps 16. The tapered end rings 14 and 15 are forced onto this structure from the inside and outward. Thereafter, the set screws 24 are inserted into threaded apertures in the end ring members 14 and 15 through apertures in sleeve 13 to abut the groove 54 in support members 11 and 12.

The use of a plurality of set screws 24 is preferable. For example, four such screws are used in the 12-18 and 16-24 inch multi-size plugs and eight such screws 24 in the 24-36 inch plugs.

As many changes are possible to the embodiments and manufacturing process of this invention, utilizing the teachings thereof, the description above, and the accompanying drawings should be interpreted in the illustrative, and not in the limited sense.

That which is claimed is:

1. An expansible pneumatic plug device for sealing the interior of a pipeline section, said device having expansible body portions to permit the sealing of a predetermined range of pipeline diameters, said pneumatic plug device comprising:
    a. interchangeable front and rear circular rigid support members for supporting the remaining elements of the device; each said rigid support member having a generally flat end portion and a body portion having parallelly disposed circumferential ridge members to form first and second grooved portions, said circumferential ridge members having top surfaces that lie in a plane of a predetermined inclined slope, at least one said rigid support member additionally having air inlet means;
    b. an exteriorly smooth and interiorly corded elastomeric sleeve member for expansion to seal against the interior wall of a pipeline, said sleeve member having interiorly disposed parallel circumferential rings of a predetermined spacing inward its ends to engage said first and second grooved portions of said rigid support members, said sleeve member further having a plurality of apertures circumferentially disposed about its ends at predetermined locations,
    c. a pair of strapping clamp members, each said clamp member for holding said sleeve member with its rings matingly between the parallel ridge members and in said second grooved portion of each said rigid support member during assembly of said device,
    d. a pair of tapered end ring members having an interior frustoconical configuration of the same predetermined slope as said rigid support ridge members for frictionally engaging the sleeve member to said front and rear rigid support members, said end ring members further having a plurality of apertures disposed circumferentially at predetermined locations, and
    e. a plurality of set screw means for threading through said tapered end ring member apertures, for extending through said sleeve member apertures and for abutting in said first grooved portion of said rigid support member bodies to fix said end ring members to said rigid support members and to further fix said sleeve member ends therebetween.

2. The expansible pneumatic plug device of claim 1, wherein the predetermined diameter range for expansion of said device varies from a given diameter to 125 to 200% greater than the diameter.

3. The expansible pneumatic plug device of claim 1, wherein said predetermined slope of said rigid support member circumferential ridge top surfaces and the predetermined slope of said tapered end ring member interior surface is two degrees plus or minus 0.5 degree.

4. The expansible pneumatic plug device of claim 1, wherein said sleeve member is constructed of an elastomeric material selected from the group consisting of poly-isoprene, polychloroprene, synthetic poly-isoprene, butadiene acrylonitrile, polyurethane, polysiloxane and fluoronated hydrocarbon elastomers, and wherein said sleeve member has reinforcement cords along its length and is constructed of a material selected from a group consisting of nylon, steel, fiber glass, Kevlar, polyester, and a graphite composite material.

5. The expansible pneumatic plug device of claim 1, wherein one said rigid support member has an additional aperture therethrough and a pressure relief valve operationally mounted thereabout in its body portion.

6. The expansible pneumatic plug device of claim 1, wherein said rigid support members are constructed of a material selected from a group of materials consisting of aluminum, stainless steel and an engineering grade plastic material.

7. The expansible pneumatic plug device of claim 1, wherein said clamping ring members are constructed of a material selected from a group of materials consisting of ductile cast iron, cast steel and cast stainless steel.

8. The expansible pneumatic plug device of claim 1, wherein said interiorly corded elastomeric sleeve member has two longitudinally extending layers of cording strands and wherein an additional reinforcement corded portion is provided at the ends of said sleeve member and which extends from the sleeve ends inwardly to at least its circumferential rings.

9. The expansible pneumatic plug device of claim 1, wherein said sleeve member has a Shore-A durometer range of 50 to 70, and wherein said sleeve member is compressed between said circumferential ridges of said rigid support members and said tapered end rings and wherein the compression reduces the thickness of the sleeve member between 24 to 32%.

10. A multi-size expansible pneumatic plug device for sealing the interior of a pipeline section said device having expansible body portions to permit the sealing of a predetermined range of pipeline diameters, said pneumatic plug device comprising:
 a. interchangeable front and rear circular rigid support members for supporting the remaining elements of the device, each said rigid support member having a generally flat end portion and a body portion having parallelly disposed circumferential ridge members having top surfaces that are in a plane having inclined slope of 2 degree plus or minus 0.5 degree to form first and second grooved portions, said rigid support members additionally having a plurality of plugged apertures through its end portions and at least one of said apertures having air inlet means;
 b. an exteriorly smooth and interiorly corded elastomeric sleeve member having a Shore-A durometer range of 50 to 70 for expansion to seal against the interior wall of a pipeline, said sleeve member having interiorly disposed parallel circumferential rings of a predetermined spacing inward its ends to engage the first and second grooved portions of said rigid support members,
 c. a pair of strapping clamp members, one said strapping clamp member for holding said sleeve member with said rings between said parallel ridge members and in said second groove portion of each said rigid support member during assembly of said device, and
 d. a pair of tapered end ring members having an interior frustoconical configuration of the same predetermined slope as said rigid support ridge member top surfaces for frictionally engaging the sleeve member to said front and rear rigid support members, said sleeve member being fixed between said circumferential ridge members of said rigid support members and said tapered end rings and is, thereby, compressed in thickness between 24 to 32%.

11. The expansible pneumatic plug device of claim 10, wherein the predetermined diameter range varies from a given diameter to 125 to 200% greater than that diameter.

12. The expansible pneumatic plug device of claim 10, wherein said sleeve member is constructed of an elastomeric material selected from the group consisting of poly-isoprene, polychloroprene, synthetic poly-isoprene, butadiene acrylonitrile, polyurethane, polysiloxane and fluoronated hydrocarbon elastomers, and wherein said clamping ring members are constructed of a material selected from a group of materials consisting of ductile cast iron, cast steel and cast stainless steel.

13. The expansible pneumatic plug device of claim 10, wherein said tapered end ring members each have peripheral threaded apertures extending therethrough and set screws for insertion through said sleeve member to fix said end ring members to its respective rigid support member.

14. The expansible pneumatic plug device of claim 10, wherein one said rigid support member has an additional aperture therethrough and a pressure relief valve operationally mounted thereabout in its body portion.

15. The expansible pneumatic plug device of claim 10, wherein said rigid support members are constructed of a material selected from a group of materials consisting of aluminum, stainless steel and an engineering grade plastic material.

16. The expansible pneumatic plug device of claim 10, wherein said interiorly corded elastomeric sleeve member has two longitudinally extending layers of cording strands and wherein an additional reinforcement corded portion is provided at the ends of said sleeve member and which extends from the sleeve ends inwardly to at least its circumferential rings.

* * * * *